US009418283B1

(12) United States Patent
Natarajan et al.

(10) Patent No.: US 9,418,283 B1
(45) Date of Patent: Aug. 16, 2016

(54) IMAGE PROCESSING USING MULTIPLE ASPECT RATIOS

(71) Applicant: Amazon Technologies, Inc., Reno, NV (US)

(72) Inventors: Pradeep Natarajan, Lexington, MA (US); Avnish Sikka, Acton, MA (US); Rohit Prasad, Acton, MA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 0 days.

(21) Appl. No.: 14/463,961

(22) Filed: Aug. 20, 2014

(51) Int. Cl.
*G06K 9/00* (2006.01)
*G06T 3/40* (2006.01)
*G06K 9/64* (2006.01)

(52) U.S. Cl.
CPC .............. *G06K 9/00463* (2013.01); *G06K 9/64* (2013.01); *G06T 3/40* (2013.01)

(58) Field of Classification Search
None
See application file for complete search history.

(56) References Cited

U.S. PATENT DOCUMENTS

| | | | |
|---|---|---|---|
| 7,231,086 B2 * | 6/2007 | Abousleman et al. | 382/199 |
| 8,538,077 B2 * | 9/2013 | Zitnick, III | 382/103 |
| 2007/0058836 A1 * | 3/2007 | Boregowda et al. | 382/103 |
| 2010/0142830 A1 * | 6/2010 | Yahata | 382/209 |
| 2011/0135203 A1 * | 6/2011 | Iwamoto et al. | 382/192 |
| 2012/0307141 A1 * | 12/2012 | Millet et al. | 348/441 |
| 2013/0195376 A1 * | 8/2013 | Baheti et al. | 382/289 |
| 2014/0270344 A1 * | 9/2014 | Krishnamoorthi et al. | 382/103 |
| 2014/0320540 A1 * | 10/2014 | Deach | 345/666 |
| 2015/0016747 A1 * | 1/2015 | Huang | 382/282 |
| 2015/0161476 A1 * | 6/2015 | Kurz et al. | G06K 9/46 |
| 2015/0178293 A1 * | 6/2015 | Chrysanthakopoulos | G06K 9/00671 |

OTHER PUBLICATIONS

Hua et al. EURASIP Journal on Image and Video Processing 2012, 2012:6.*
Bay, et al., Speeded-Up Robust Features (SURF). Computer Vision and Image Understanding (CVIU), vol. 110, No. 3: pp. 346-359, 2008.
Csurka, et al., Visual Categorization with Bags of Keypoints. ECCV International Workshop on Statistical Learning in Computer Vision, vol. 1, No. 1-22, Prague, 2004.
Dalal, et al., Histograms of Oriented Gradients for Human Detection. Computer Vision and Pattern Recognition, 2005. CVPR 2005. IEEE Computer Society Conference, vol. 1. IEEE, 2005.
Fogel, et al., Gabor Filters as Texture Discriminator. Biological Cybernetics, vol. 61, No. 2: pp. 103-113, 1989.
Forssen, et al., Shape Descriptors for Maximally Stable Extremal Regions. Computer Vision, 2007. ICCV 2007. IEEE 11th International Conference on, pp. 1-8. IEEE, 2007.

(Continued)

*Primary Examiner* — Stephen R Koziol
*Assistant Examiner* — Jiangeng Sun
(74) *Attorney, Agent, or Firm* — Seyfarth Shaw LLP; Ilan N. Barzilay; David A. Klein

(57) ABSTRACT

A system to recognize text, objects, or symbols in a captured image using machine learning models reduces computational overhead by generating a plurality of thumbnail versions of the image at different downscaled resolutions and aspect ratios, and then processing the downscaled images instead of the entire image, or sections of the entire image. The downscaled images are processed to produce a combine feature vector characterizing the overall image. The combined feature vector is processed using the machine learning model.

17 Claims, 10 Drawing Sheets

(56) References Cited

OTHER PUBLICATIONS

Gemert, et al., Kernel Codebooks for Scene Categorization. Computer Vision—ECCV 2008, Proceedings of the 10th European Conference on Computer Vision: Part III, pp. 696-709. Springer Berlin Heidelberg, 2008.

Jain, et al., Text Detection and Recognition in Natural Scenes and Consumer Videos. IEEE International Conference on Acoustic, Speech and Signal Processing (ICASSP), 2014.

Laptev, On Space-Time Interest Points. International Journal of Computer Vision, 64(2/3): pp. 107-123, 2005. Springer Science + Business Media, Inc.

Lowe, Object Recognition from Local Scale—Invariant Features. Computer Vision, 1999. Proceedings of the Seventh IEEE International Conference on vol. 2, pp. 1150-1157. IEEE, 1999.

Matas, et al., Robust Wide Baseline Stereo from Maximally Stable Extremal Regions. Image and Vision Computing 22, No. 10, British Machine Vision Computing 2002—Special Issue, pp. 761-767, 2004.

Nakajima, et al., Multiple Kernel Learning for Object Classification. Technical Report on Information-Based Induction Sciences, 2009 (IBIS2009).

Neumann, et al., A Method for Text Localization and Recognition in Real-World Images. 10th Asian Conference on Computer Vision—ACCV 2010, pp. 770-783. Springer Berlin Heidelberg, 2011.

Ojala, et al., Performance Evaluation of Texture Measures with Classification Based on Kullback Discrimination of Distributions. Pattern Recognition, 1994. vol. 1—Conference A: Computer Vision & Image Processing., Proceedings of the 12th IAPR International Conference on, vol. 1, pp. 582-585. IEEE, 1994.

Sanchez, et al., Image Classification with the Fisher Vector: Theory and Practice. International Journal of Computer Vision 105, No. 3 (2013).

Van De Sande, et al., Evaluating Color Descriptors for Object and Scene Recognition. Pattern Analysis and Machine Intelligence, IEEE Transactions on 32, No. 9 (2010): pp. 1582-1596.

\* cited by examiner

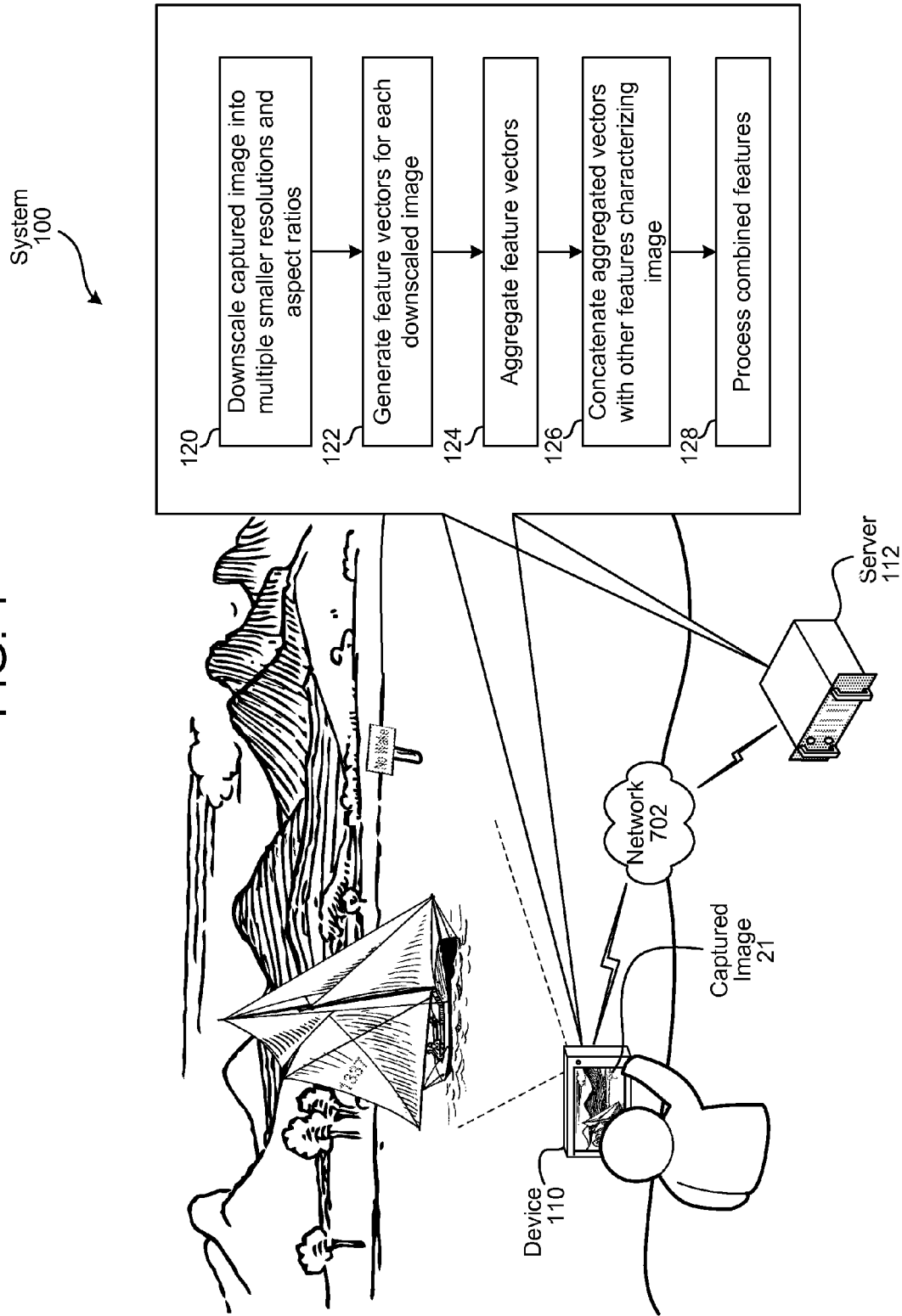

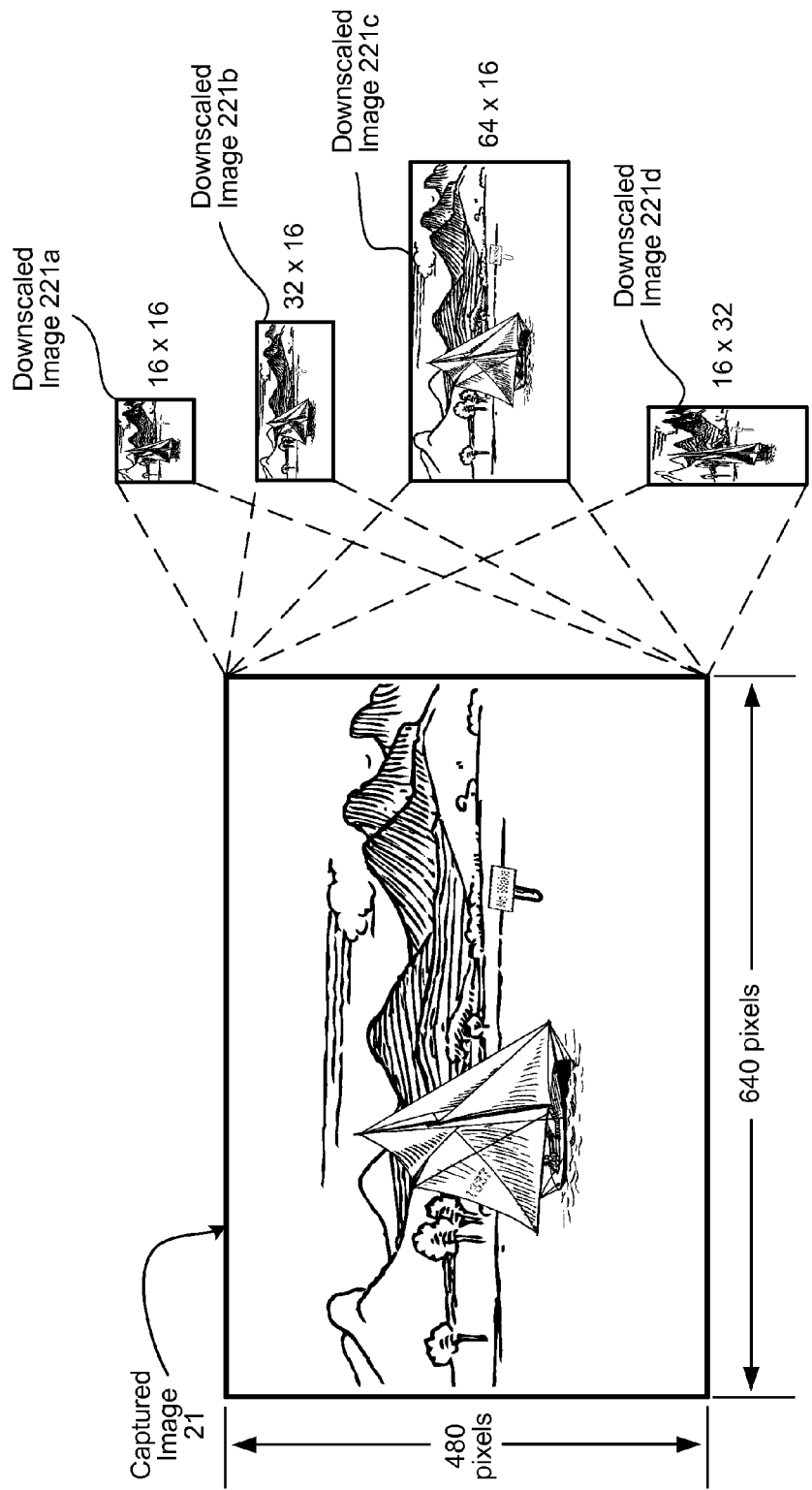

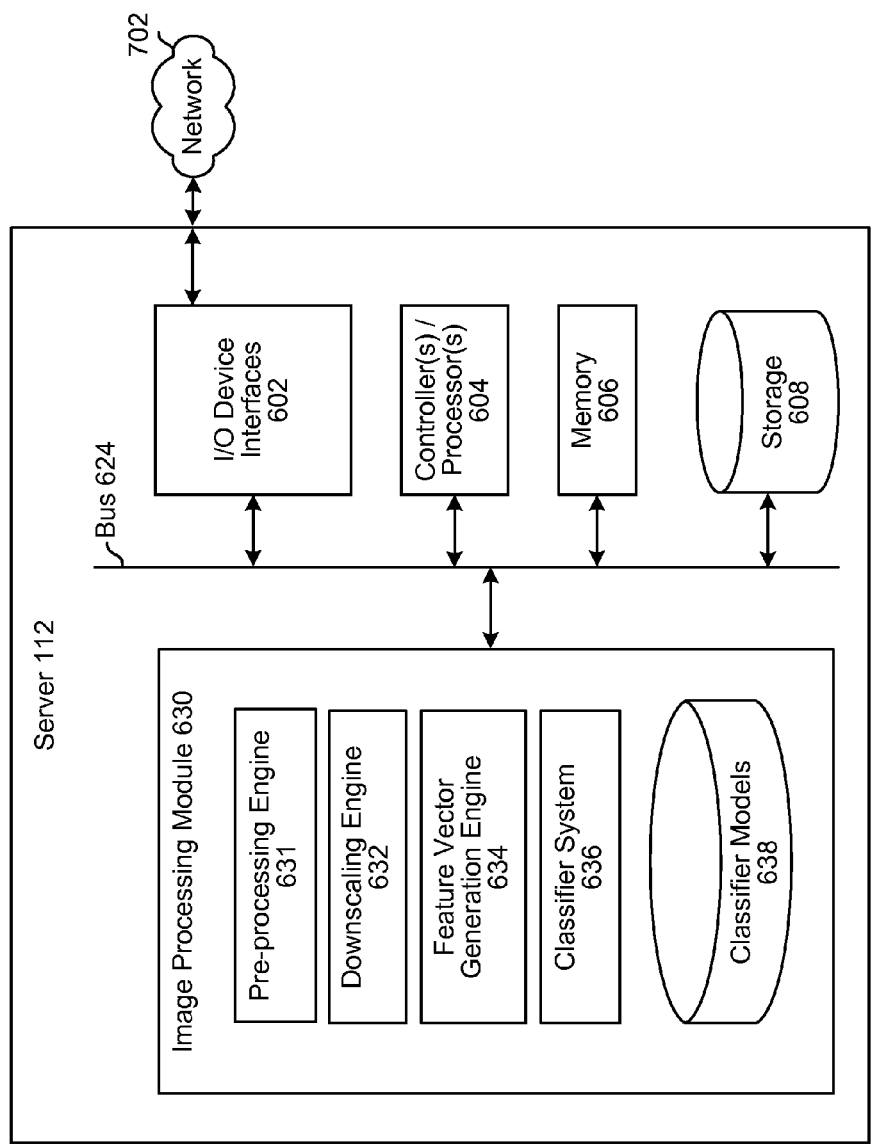

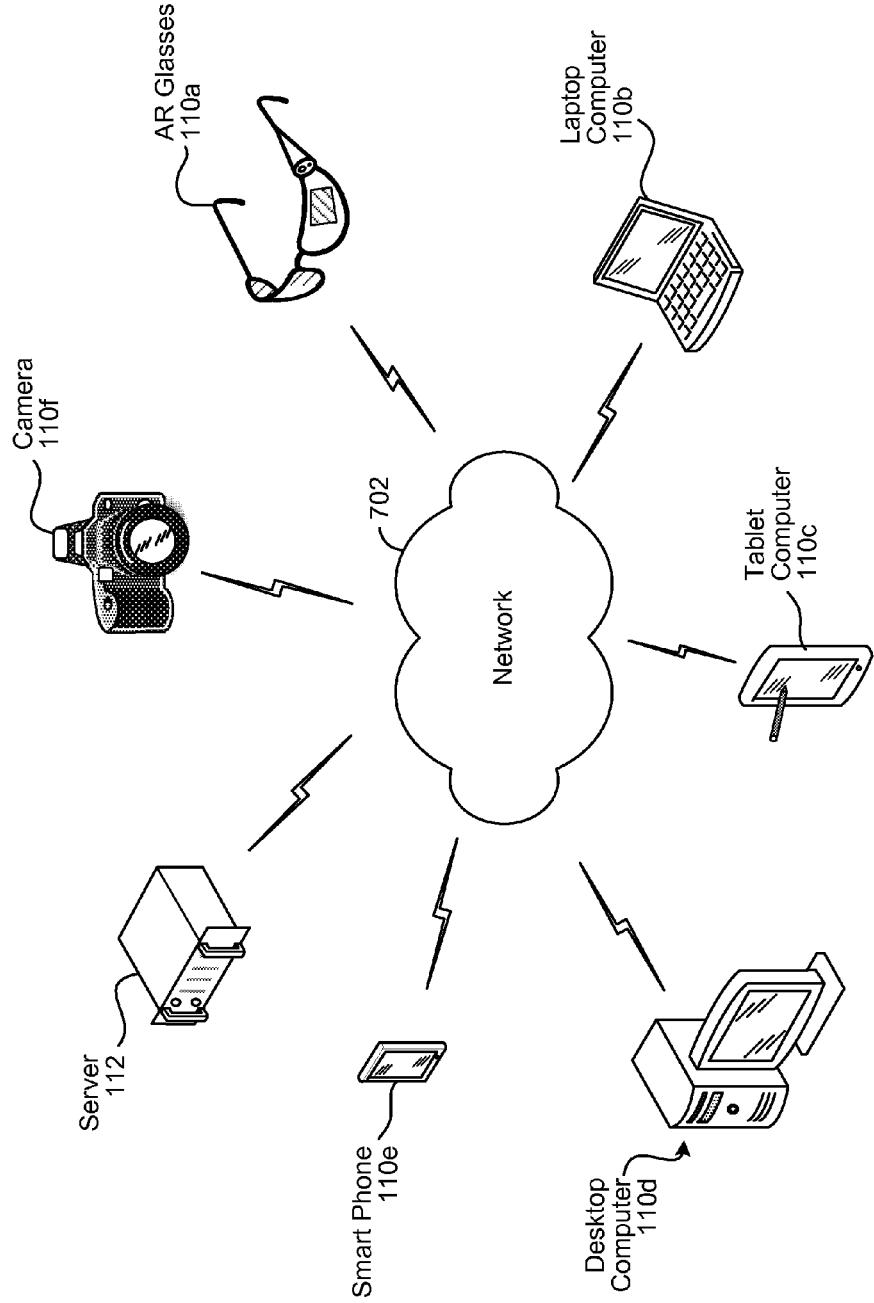

IMAGE PROCESSING USING MULTIPLE ASPECT RATIOS

BACKGROUND

Electronic devices may perform image processing on captured images to identify text, symbols and specific objects. The accuracy of such systems depends in part upon how much visual clutter is included in a captured image.

BRIEF DESCRIPTION OF DRAWINGS

For a more complete understanding of the present disclosure, reference is now made to the following description taken in conjunction with the accompanying drawings.

FIG. 1 illustrates an image processing system utilizing multiple aspect-ratio gradients.

FIG. 2A illustrates generation of multiple aspect-ratio downscaled images.

FIG. 6 is a block diagram conceptually illustrating example components of a network-connected server for processing an image captured by a device.

FIG. 7 illustrates an example of a computer network for use with the system.

DETAILED DESCRIPTION

Figure 2B:
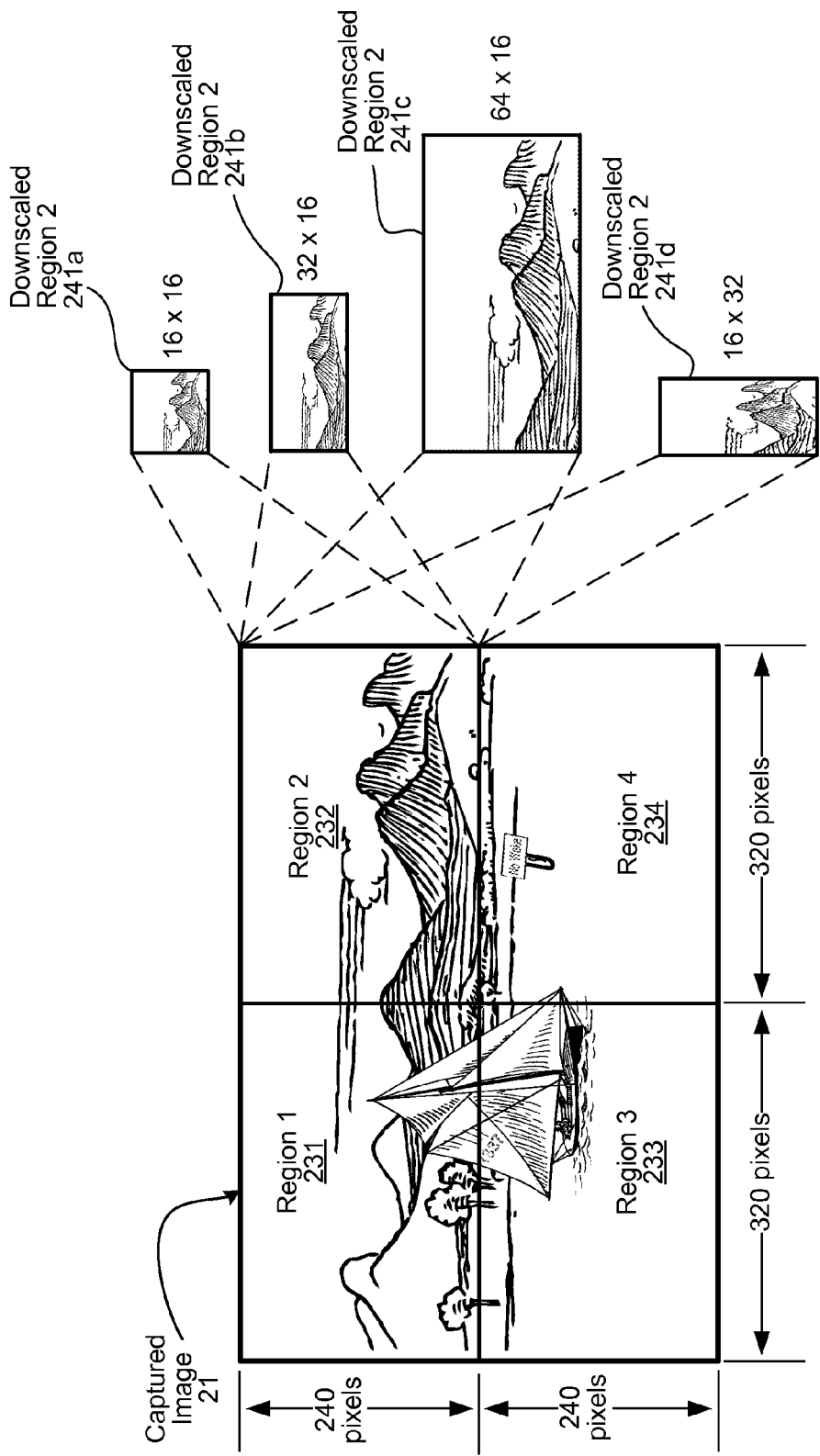
FIG. 2B illustrates generation of multiple aspect-ratio downscaled images from a sub-divided portion of the original image.

In the field of computer vision, various techniques exist to detect and describe local features in an image or video. An image can be characterized as a set of "feature vectors," with identifiable points in the image such as its edges and high-contrast features being extracted to identify objects in the image. These feature vectors can be compared to models created using extracted data from "training" images to identify an object or objects in the image. Applications of such image processing techniques include (among other things) object recognition, text recognition, three-dimensional modeling, gesture recognition, video tracking, and facial recognition.

An adaptive computer system is "trained" to recognize an object by repeatedly providing positive and negative examples of images containing an object as input into an adaptive model until the system can consistently identify the object in an image even if the object does not appear in the exact same way as it did in the images used to train the system. An "object" can be most anything, such as a glyph (e.g., a number or a letter of an alphabet), an automobile, a cat, a tree, a person, a hand, etc. By creating different models using feature vectors extracted from examples of images containing (and not containing) different objects, a computer may compute can "recognize" an object by applying the models to the data and determining which (if any) model most closely matches the input image.

Getting an adaptive model to consistently identify a pattern is in-part dependent upon providing the system with training data represented in such a way that patterns emerge in the feature vectors. Provided data with consistent patterns, recognizing such patterns when presented with new and different data is within the capacity of today's computer systems, and such adaptive-model processing is in fact used by a wide variety of computer systems ranging from handheld personal consumer electronics to complex massively parallel supercomputers. Such efforts fall into the discipline often referred to as "machine learning," which is a sub-discipline of artificial intelligence (also known as machine intelligence).

In a conventional image-processing pipeline such as "Bag-of-Words" ("BoW") local features are detected and described (e.g., mathematically characterized as feature vectors based on pixel gradients, intensity patterns, etc.), the local feature "descriptors" are aggregated (producing an aggregated multi-dimensional feature vector), and the aggregated descriptors are quantized based on a codebook. Codebooks may contain tens-of-thousands of "words" corresponding to feature vectors, and are used to simplify classification by generalizing the data. An example of an algorithm used for feature detection and description is scale-invariant feature transform (SIFT). Once aggregated and quantized, the quantized feature vector descriptors produced by SIFT may be input into a trained classifier, which applies one or more adaptive models, that may be stored in a database or integral to the classifier, to determine whether patterns identified when the system was trained are or are not present in the data. Examples of classifiers include Support Vector Machines (SVMs), neural networks, decision trees, AdaBoost (short for "Adaptive Boosting") combined with decision trees, and random forests. In some of these classifiers (e.g., neural networks), the models for different objects may not be discrete models, but rather, aspects of a single integrated model that can be used to identify a plurality of different objects. Among other things, the combination of BoW and SIFT can identify objects among visual clutter, with changes in orientation, and with changes in illumination. However, performing SIFT on an image can be a computationally intensive process, even if the image is subdivided into several smaller sections.

FIG. 1 illustrates a system 100 that achieves similar results to such traditional image processing pipelines, but improves computational speed. Instead of processing the original captured image or subdivided sections of the original image, the captured image 21 is downscaled (120) into multiple lower resolutions images at several different aspect ratios. Among other sizing schemes, the sizes of the different aspect ratios may be comparable to the "patch" sizes used for extracting local features with SIFT (explained further below).

For example, an original captured image 21 that is 640 pixels by 480 pixels may be down scaled (120) into multiple images with resolutions of 16×16, 16×32, 16×48, 16×64, 32×16, 48×16 and 64×16 pixels. In essence, each of these downsized images is a "thumbnail" of the original image 21, but since the aspect ratios may be different, the features in the downsized image may appear to be distorted (in addition to having less detail) relative to the original image 21.

FIG. 2A illustrates examples of this downscaling. An image 21 captured by a device 110 at a resolution of 640 by 480 pixels is downscaled into a plurality of scaled images having different resolutions and aspect ratios, such as a scaled image 221a with a resolution of 16×16 pixels, a scaled image 221b with a resolution of 32×16 pixels, a scaled image 221c with a resolution of 64×16 pixels, and a scaled image 221d with a resolution of 16×32 pixels. The images in FIG. 2A are not drawn to scale, and the downscaled resolution of the scaled images 221a to 221d lack the pixilation that would be present in actual downscaled images. However, the downscaled images 221a to 221d do illustrate that the differences in aspect ratios may result in a spatial distortion of the scaled images.

A variety of downscaling techniques may be used to perform the image resizing, such as bilinear or bicubic interpolation. While each of the downsized images may lack sufficient resolution to resolve all the features in the original image, processing a plurality of different downsized images can produce comparable results to existing techniques at a fraction of the computational overhead.

Returning to FIG. 1, image-gradient feature vectors are computed (122) for each of the downscaled images. First, gradients and derivatives of the downsized images are computed in Cartesian x and y directions. Next, for each pixel, the gradients are used to compute the orientation and magnitude of a gradient vector. For example, for each pixel in a 16×16 scaled image (221a), an intensity gradient and an angle is determined between the particular point and surrounding pixels in that point's "neighborhood" (the "point" being a particular pixel). In the 16×16 image, that may mean that an angle and an intensity gradient is calculated between a particular point and every other pixel in the image, although the size of the "neighborhood" used for processing may be less than 16×16, such as 8×8 or 4×4 (e.g., SIFT conventionally subdivides a patch into sub regions), dividing the downscaled image into a plurality of sub regions. If sub-divided, the data from each sub-region is combined to characterize the 16×16 downsized image as a whole. This process may be repeated, up to and including using every pixel in the image as a "point."

The image intensity gradient computed for each pixel in a neighborhood around a particular pixel is calculated, resulting in an X gradient and a Y gradient for each pixel in the neighborhood, relative to the particular pixel. Then an angle is assigned to each gradient magnitude based on the X and Y gradient values using a predefined set of quantized-orientation "bins," and a weight is assigned based on the computed X gradient and Y gradient magnitudes. The "bin" assignment is based upon quantizing angles into one of eight "bins," such as anything from zero to forty-five degrees being part of "bin zero," anything from forty five to ninety degrees being part of "bin one," etc. Eight bins is an example, and a different quantity of discrete bins may be used instead of eight.

The weights assigned within each bin are added. If there are eight bins, this results in eight weights, each weight having a quantized angle. This histogram (of eight magnitudes is then normalized, and the normalized result serves as an eight-dimensional feature vector. If the eight-dimensional feature vector covers the entire downsized image, that is the feature vector for the respective downsized image. If the downsized image is subdivided, the feature vectors from each of the subdivided regions are concatenated, and the concatenated feature vectors is the feature vector for the respective downsized image.

The feature vectors from all of the downsized images (e.g., 221a to 221d in FIG. 2A) are then concatenated (124) to get the final feature vector for input image. Other features characterizing the image may also be concatenated (126) with the final feature vector. The final feature vector for the image is then processed (128) to identify objects within the original image or determine a characteristic of the image (e.g., input into a trained classifier). The determined characteristic of the image may be, for example, a determination as to whether it is likely or unlikely that an object or objects are present in the image based on whether a determined score is above or below a threshold value.

This "Multi(ple) Aspect-Ratio Gradients" process has certain similarities to the processing pipeline that is used with popular local feature recognition algorithms such as SIFT and histogram of oriented gradients (HoG). These traditional processing pipelines in computer vision systems typically involve the following steps: 1) extract local features from a set of spatial (for images) or spatio-temporal (for videos) regions; 2) project the local features to a pre-trained codebook of feature vectors (typically 4000 dimensions); 3) aggregate the projections (i.e., quantized feature vectors) to get a final image/video level representation (typically by averaging the projections).

In SIFT, if a particular point in an image is of interest, SIFT processes a pixel neighborhood (e.g., 16×16 pixel neighborhood, also referred to as a "patch") of the image around that point. Then an image intensity gradient is computed at each pixel around that point and the data is aggregated into a histogram. The aggregated data includes the computed intensity gradient between the point of interest and each point in the neighborhood, and an angle of the gradient at each point (the angle providing the direction of the neighborhood pixel relative to the point of interest). The angle may be quantized into a bin representing a range of angles.

As a next step, references to an image are generated using several such SIFT features computed at different regions of the image. Once the SIFT features are computed, they are compared to a "code book" of SIFT features, further quantizing the data (in addition to binning the angles). So for a four-thousand word code book of SIFT features, each point in the image may be compared to the code book and assigned the nearest code word among the four-thousand code words. The determined code words are aggregated across all the points of the image to get a histogram representation of the entire image. The result is an aggregated histogram representation of the image which may be used by conventional image-processing pipelines for a computation.

HoGs are feature descriptors used in computer vision and image processing for the purpose of object detection. The HoG technique counts occurrences of gradient orientation in localized portions of an image, and is similar to that of edge orientation histograms, SIFT descriptors, and shape contexts. However, HoG is different from these other techniques in that it is computed on a dense grid of uniformly spaced cells and uses overlapping local contrast normalization for improved accuracy. Locally normalized HoG descriptors offer particular performance advantages relative to other existing feature sets, computed on a dense grid of uniformly spaced cells and using overlapping local contrast normalizations.

While SIFT and HoGs have been successfully employed in a variety of applications, these approaches are unsuitable for low latency applications written to run on thin clients such as mobile and handheld devices. For example, consider a 640×480 pixel image. Extracting a one-hundred-twenty-eight dimensional local SIFT feature from a dense grid separated by four pixels in the x and y directions and aggregating them to produce a four-thousand dimensional feature involves approximately $10^{10}$ computations.

In the improved system 100 in FIG. 1, the original image is resized into multiple different aspect ratios and then SIFT-like features are computed within each of those different aspect ratios, and the results are concatenated (e.g., aggregated, combined). As the overall number of feature vectors are reduced, this approach provides a gain in overall computational performance in comparison to the conventional pipeline. For example, consider resizing the original image to sizes 16×16, 16×32, 16×48, 16×64, 32×16, 48×16 and 64×16, and characterizing the features of each downscaled image. This process would take approximately 40,000 computations and represents a 250,000 times speed up in computation compared to the traditional process. In addition, since the resulting number of dimensions of the aggregated feature vectors is smaller, the improved process may be performed without the use of codebooks.

A further improvement in computational speed may be obtained by approximating an angle and a magnitude of each vector for each pixel in a patch and/or patch subregion based in part on the vector's scalar values, avoiding the computationally-expensive calculation of angle using arc tangent and calculation of magnitude using square roots For example, let scalar values Lx and Ly correspond to the gradients at a pixel in the x and y directions respectively. The angle of the gradient may be computed by calculating an arctan of Lx and Ly, which is a relatively intensive computation, slowing processing. However, since the angle is going to be assigned to a quantized bin, the angle may be assigned without computing the actual angle with little to no impact on accuracy, but with a significant improvement in computational speed. For example, if there are eight bins, with each bin corresponding to forty-five degrees, then Bin 1 corresponds to angles of zero up to forty-five degrees, Bin 2 corresponds to forty-forty-five up to ninety degrees, etc. A vector along the positive X axis (Ly=0) corresponds to zero degrees, and a vector along the positive Y axis (Lx=0) corresponds to ninety degrees. An example of how binning may be performed based on the Lx and Ly scalar vectors is presented in Table 1:

TABLE 1

| Bin | Angle (Degrees) | Scalar Values |
|---|---|---|
| 1 | 0 ≤ θ < 45 | 0 ≤ +Ly < +Lx |
| 2 | 45 ≤ θ < 90 | +Lx ≤ +Ly |
| 3 | 90 ≤ θ < 135 | 0 ≤ \|−Lx\| < +Ly |
| 4 | 135 ≤ θ < 180 | +Ly ≤ \|−Lx\| |
| 5 | 180 ≤ θ < 225 | 0 ≤ \|−Ly\| < \|−Lx\| |
| 6 | 225 ≤ θ < 270 | \|−Lx\| ≤ \|−Ly\| |
| 7 | 270 ≤ θ < 315 | 0 ≤ +Lx < \|−Ly\| |
| 8 | 315 ≤ θ < 360 | \|−Ly\| ≤ Lx |

Referring to Table 1, if a vector has an angle equal to zero degrees up to forty-five degrees it is to be assigned to Bin 1, if a vector has an angle equal to forty five degrees up to ninety degrees, it is assigned to Bin 2, etc. Using the scalar values to do bin assignments, if Ly is positive or zero and is less than a positive Lx, the vector is assigned to Bin 1 without determining the actual angle. If a positive Lx value is equal to a positive Ly value, then the angle of the vector is as forty-five degrees and it is assigned to Bin 2. If a positive Lx value is less than a positive Ly value, then it is between forty-five and ninety degrees and is also assigned to Bin 2. If Lx is zero and Ly is positive, then the angle is ninety degrees and the vector is assigned to Bin 3. If Lx is negative, and the absolute value of Lx is less than a positive Ly value, then the angle is between ninety and one hundred thirty five degrees, and the vector is assigned to Bin 3. And so on. Thus, a basic comparison of the scalar values may be used to bin the vectors without using an arctan function to calculate actual angles, making binning computationally simpler and resulting in a significant reduction in the computations needed to bin the vectors. Similar methodology may also be used if there are four bins instead of eight (binning by axes quadrants).

A magnitude of each gradient may approximated based on Equation 1 as follows:

$$\sqrt{Lx^2 + Ly^2} \cong \frac{1}{2}\left(1 + \frac{1}{4 - 2\sqrt{2}}\right) \min\left(\max(|Lx|, |Ly|), \frac{|Lx| + |Ly|}{\sqrt{2}}\right) \quad (1)$$

The left-hand side of the above Equation 1 is the accurate magnitude computation and the right hand side is the approximation. The square root of two is a constant, and thus, can be pre-calculated or hard-coded. This approximation produces an error of approximately 4% in the magnitude computation, but the elimination square root reduces computational overhead. The approximation may be combined with a modified SIFT and HoG feature descriptor computation algorithm.

FIG. 2B illustrates a variation on the process of the system 100 where the captured image 21 is subdivided into multiple regions (231-234), and the downscaling process is performed on one or more of the regions (e.g., downscaled images 241a to 241d generated from the second region 232). The number of regions illustrated in FIG. 2B is an example (dividing the image into quadrants), and other divisions schemes may be used, such as dividing the image into vertical or horizontal stripes. A pre-filtering step may be performed prior to initiating the illustrated process to identify regions that are and are not of interest, where the process is only performed on regions of interest. For example, color variation or contrast within the region may be calculated, and if the value is below a threshold (suggesting that the region contains few if any features), further processing may be skipped. The process pipeline is otherwise the same as discussed with FIG. 1, with the captured image being a region instead of the entire image, and the process being repeated for each region of interest.

Figure 3:
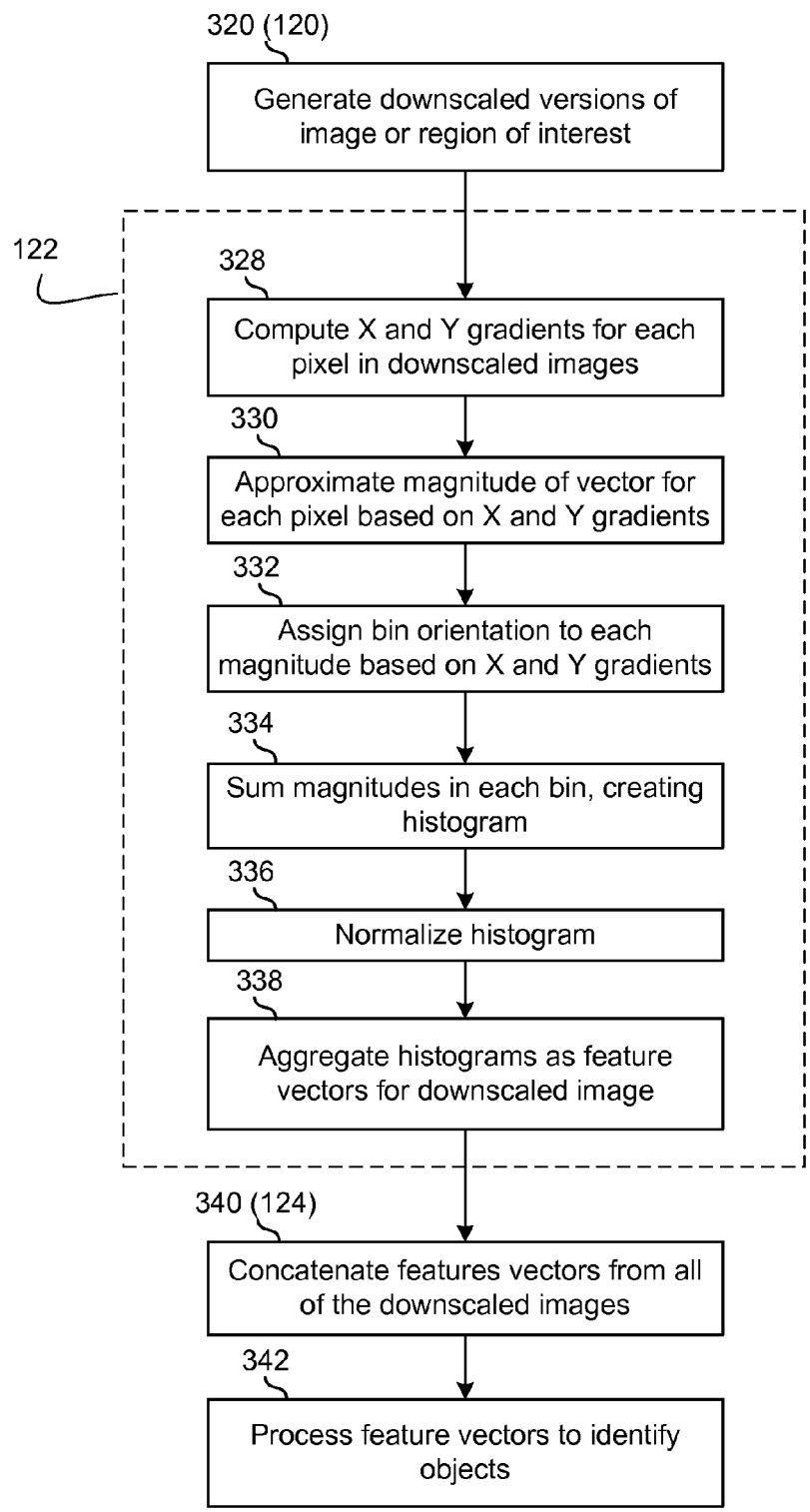
FIG. 3 illustrates a process utilizing multiple aspect-ratio gradients.

FIG. 3 is an expanded illustration of the process in FIG. 1. The captured image 21 is processed to generate (320/120) multiple downscaled versions of the image 21, as illustrated, for example, in FIG. 2A. Intensity gradients for the pixels of the downscaled images are computed (328) in X and Y directions. From each X and Y intensity gradient for a pixel, a magnitude of the gradient are calculated for each pixel, and approximate magnitudes are determined (330) as describe above with Equation 1. A quantized bin angle is assigned (332) to each magnitude, either using an arctan function based on the X and Y gradients or based on an approximation (e.g., bin assignment) of the angle as discussed above with Table 1. Then the pixel data is in each bin is then summed (334), resulting in a histogram, and each histogram is normalized (336). Examples of normalization schemes that may be used include "L1" normalization (also known in the art as "least absolute deviation" (LAD) and "least absolute errors" (LAE)) and "L2" normalization (also known in the art as "least squares"). Normalization may be configured to transform the histogram magnitude values so that each is expressed on a uniform scale, such as in the range of zero to one (i.e., 0% to 100%), or some other equivalent range (e.g., a magnitude expressed in eight bits in a range from zero (binary 00000000) to two-hundred-fifty-five (binary 11111111). The bin angle and the normalized magnitude associated with the bin is a vector. The normalized histograms are then aggregated (338), with each normalized histogram contributing an eight-dimensional vector (if eight bins) to the aggregated feature vector. If the downscaled was subdivided into multiple pixel neighborhoods (e.g., subdividing a 16×16 image into 8×8 or 4×4 neighborhoods), resulting in multiple feature vectors for a same downscaled image, the feature vectors from each neighborhood are concatenated to generate the feature vector for the respective downscaled image.

The resulting image vectors from each downscaled image are then concatenated together 340 (124). This concatenated multi-dimensional feature vector may then be input into the classifier (342) to determine whether the features are similar to one or more of the classifier models. The classifier may assign a "score" characterizing the similarity, and whether an image is or is not considered "similar" is based on whether the score is above or below a threshold value. The score may indicate that an object is identified in the image or correspond to a determined characteristic of the image.

The input to the classifier may include more than just the feature vectors from the processes discussed in connection with FIGS. 1 and 3. Specifically, the feature vectors from the downscaled images may be concatenated (126) with other data extracted from the original image 21 (or a respective region 231-234) to identify image-content of interest.

For example, if attempting to identify text in an image, a region detector may be used such as maximally stable extremal regions (MSERs) to determine portions of the image or region that contain features consistent with the content of interest. MSERs are a method of blob detection in images, where each blob may be a text character, symbol, or whatever other content the MSER algorithm is configured to identify.

If using MSERs, the image vectors from the process pipeline discussed above (e.g., FIGS. 1 and 3) relating to the image (FIG. 2A) or a specific sub region (e.g., 231-234 in FIG. 2B) that contains the MSER may be concatenated with salient features determined from the respective MSER to classify whether the MSER does or does not contain a text glyph. The image vectors provide contextual features relating to the surrounding image that the MSERs lack, and the combination of the image/sub-region feature vectors reduces the occurrence false-positive and false-negative glyph classifications, in comparison to using the salient features derived from the MSERs alone.

MSER candidate region detection algorithms are described by J. Matas, O. Chum, M. Urban, and T. Pajdla. in "Robust wide baseline stereo from maximally stable extremal regions," published in the Proceedings of the British Machine Vision Conference, pages 384-396, in 2002, the contents of which are incorporated herein by reference for explanation of MSER detection algorithms. Numerous refinements and improvements on MSER detection algorithms have been published since the 2002 Matas paper, and the MSER detection algorithms that may be used with the disclosed processes are not limited to the original algorithms in the 2002 paper. Other image processing algorithms may be used instead of, or in combination with, MSER detection algorithms in order to identify candidate character locations in the captured image.

Figure 4A:
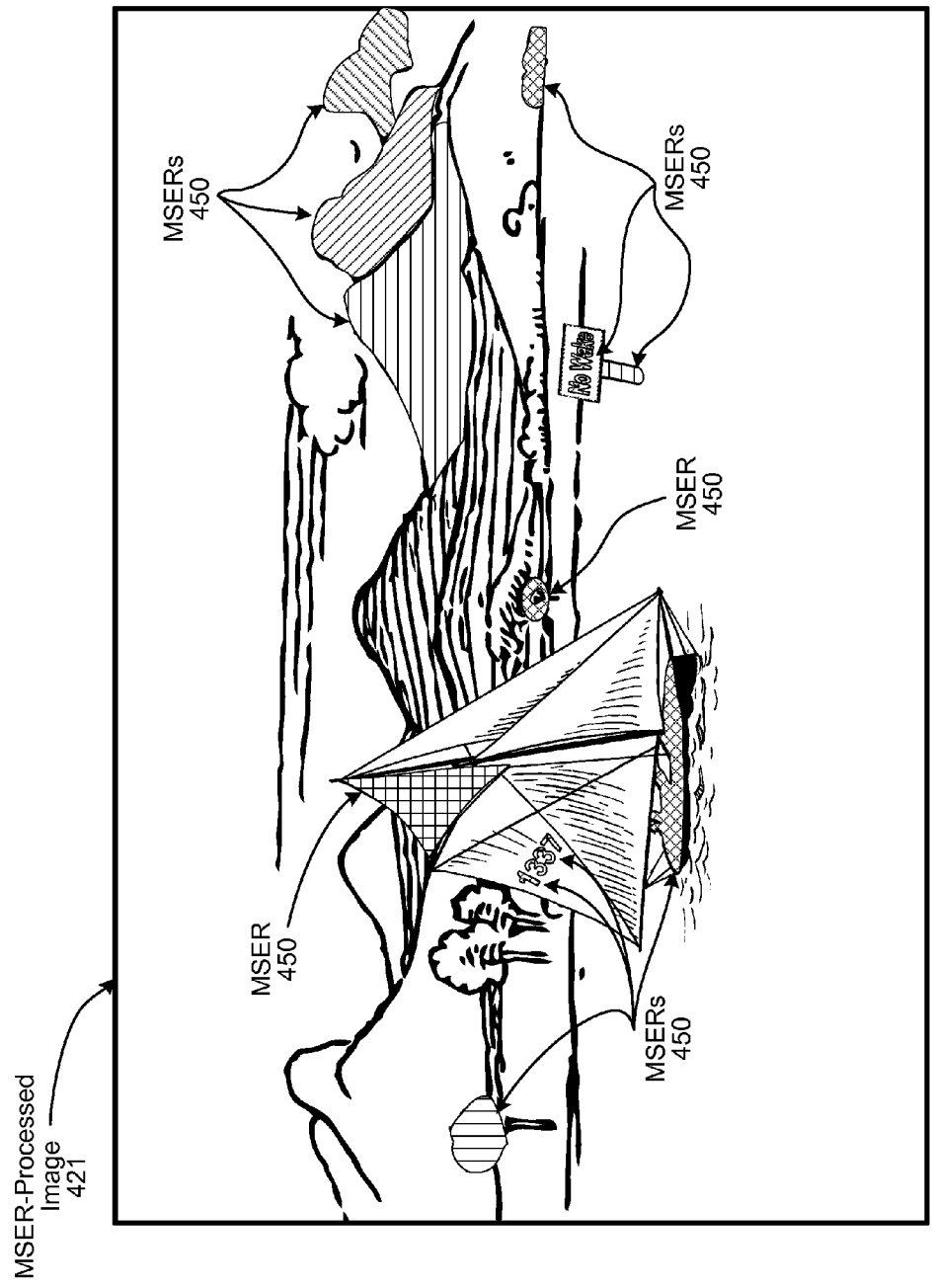
FIG. 4A illustrates identified candidate character locations in the original image.

FIG. 4A illustrates an MSER-processed image 421 where sets of potential character locations 450 have been identified in the captured image. Using the MSERs, a plurality of image elements may be identified as potentially containing text characters/glyphs and extracted. MSERs are well-suited to extracting elements where the image element is warped or skewed, and are relatively unaffected by variations in image intensities. As is known in the art, the MSER candidate locations 450 may be defined by a "feature vector" (an n-dimensional vector of numerical features) comprising an intensity function in the candidate location and the outer border. In the example illustrated in FIG. 4A, many of the MSER candidate locations 450 do not correspond to text/glyphs. Even so, the MSER algorithm reduces overall computational overhead by identifying the regions of the image that may contain text/glyphs, since determining whether a region is a true character location is ordinarily more computationally intensive than the MSER algorithm.

To locally classify each candidate character location as a true text character/glyph location, a set of features that capture salient characteristics of the candidate location is extracted from the local pixel pattern. A list of example characteristics that may be used for glyph classification is presented in Table 2, and will be explained in connection to FIGS. 4B to 4G:

TABLE 2

| Feature | Description |
| --- | --- |
| Aspect Ratio | (bounding box width/bounding box height) |
| Compactness | $4 * \pi *$ candidate glyph area/(perimeter)$^2$ |
| Solidity | candidate glyph area/bounding box area |
| Stroke-width to width ratio | maximum stroke width/bounding box width |
| Stroke-width to height ratio | maximum stroke width/bounding box height |
| Convexity | convex hull perimeter/perimeter |
| Raw compactness | $4 * \pi *$ (candidate glyph number of pixels)/(perimeter)$^2$ |
| Number of holes | number of holes in candidate glyph |

Figure 4C:
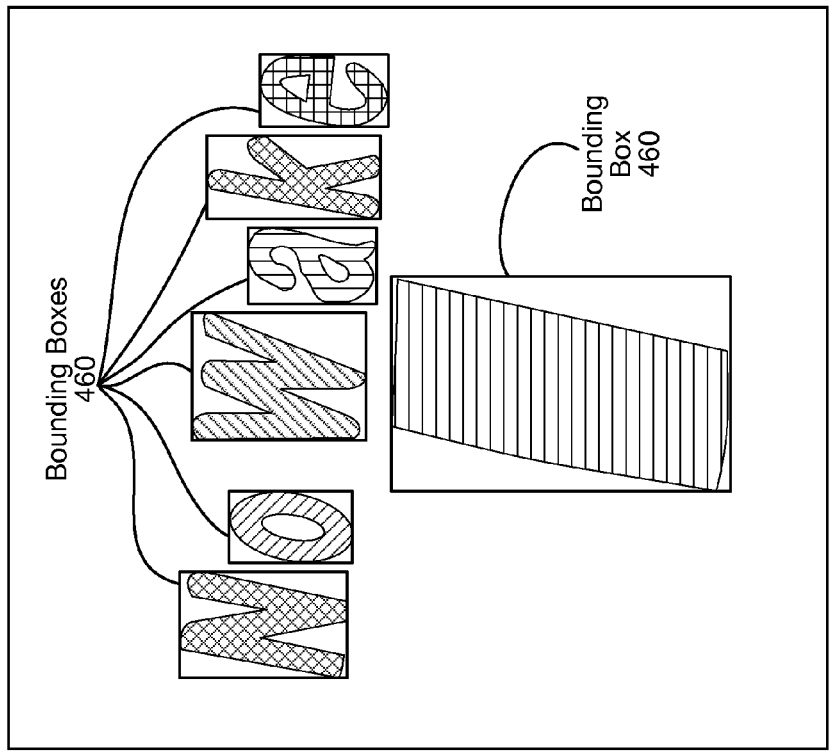
FIG. 4C illustrates extracted candidate characters in bounding boxes.
Figure 4B:
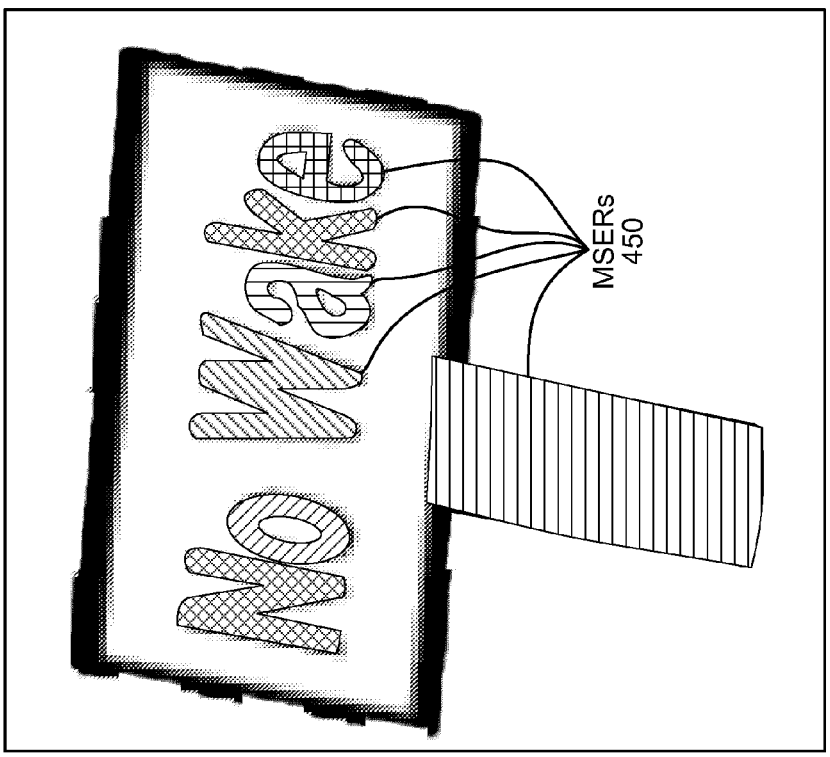
FIG. 4B illustrates a section from FIG. 4A, illustrating outlines of the candidate characters overlaid on the original image.

Some or all of the features illustrated in Table 2 may be used for classification of each glyph, and other features may be added. FIG. 4B illustrates an example of MSERs 450 overlayed on a section of the captured image 21. The different patterns of the illustrated MSERs are provided to emphasize MSER boundaries, and do not have any significance to the respective MSER. FIG. 4C illustrates the extracted MSERs 450. A bounding box 460 is illustrated for each extracted MSER based on the respective MSER's height and width, relative to the orientation of the captured image 21. The "Aspect Ratio" glyph classification feature in Table 2 is determined for an individual candidate character by dividing the width of a bounding box divided by the bounding box height.

Figure 4D:
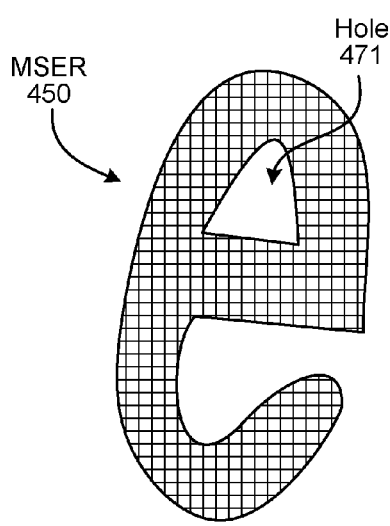
FIGS. 4D to 4G illustrate various features of an extracted candidate character that may be used to characterize the candidate character.
Figure 4E:
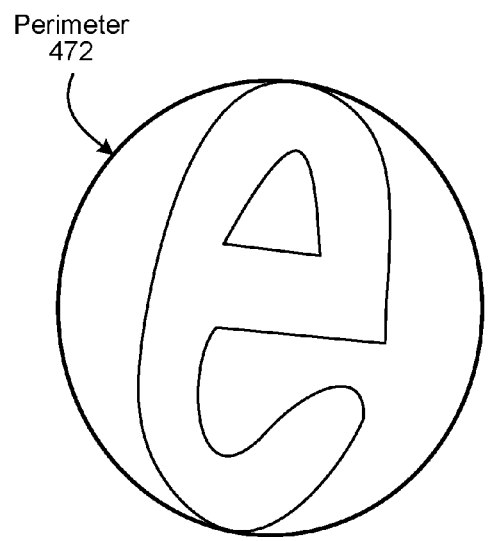

FIG. 4D illustrates an individual extracted candidate character as an MSER 450, which include one hole 471. The "area" of the candidate character corresponds to the shaded portion of the MSER 450. The "Compactness" is based on a ratio of the area of the shape to the area of a circle encompassing the shape. The "Compactness" of the candidate character is equal to four times the constant "Pi" times the area of the candidate character, divided by the square of the perimeter 472 of a circle encompassing the candidate character (illustrated in FIG. 4E). An estimate of the perimeter 472 may be determined based on a longest distance between two edges of the MSER 450. The "Solidity" of the candidate character is the area of the candidate character divided by the area of the bounding box 460 (i.e., bounding box height times width).

Figure 4F:
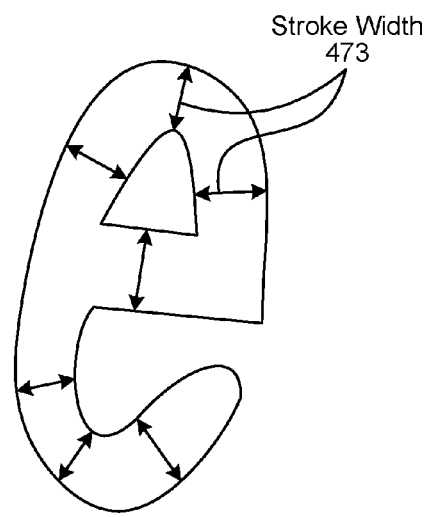
Figure 4G:
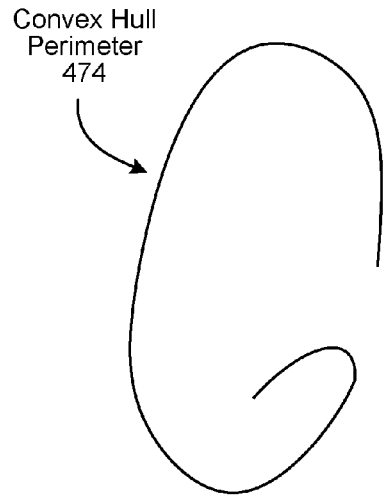

FIG. 4F illustrates various stroke widths 473 of the candidate character. One technique for measuring stroke width is to detect edges of the candidate character (e.g., using Canny edge detection), and then measure across the candidate character from one edge to an opposite edge. In particular, the measurement may be measured perpendicular to a tangent at one edge of the candidate character to a parallel tangent at an opposite edge. A maximum stoke width of the glyph is used to calculate the stroke-width to glyph-width ratio and the stroke-width to glyph-height ratio. As text characters in most languages have consistent stroke widths throughout the glyph, stroke widths 473 that exhibit significant variation (e.g., exceeding a standard deviation of all stroke widths by a threshold value) may optionally be ignored when determining the maximum stroke width for classification.

Referring back to Table 2, "Stroke-Width to Width ratio" is the maximum stroke width of a candidate character divided by the width of the character's bounding box 460. Similarly, "Stroke-Width to Height ratio" is the maximum stroke with of a candidate character divided by the height of the character's bounding box 460.

"Convexity" is a candidate character's convex hull perimeter 474 (illustrated in FIG. 4G) divided by the perimeter 472. The edges of a candidate character may be expressed as sequence of lines and curves. The convex hull perimeter 474 corresponds to peripheral portions of the MSER 450 that exhibit convex edges. "Raw Compactness" is equal to four times the constant Pi times the number of pixels comprising the candidate character divided by the square of the perimeter 472.

The classifier system may then process (128/342) one or more descriptive features (Table 2) derived from the candidate glyph regions (i.e., MSERs 450) together with the feature vectors determined from the downscaled images to classify/identify features within each candidate glyph regions. In essence, the feature vectors from the downscaled images (221*a-d* and/241*a-d*) characterize contextual aspects of the image or region beyond those within the MSER. If the classifier is trained to recognize features from the MSERs that correctly identify the subject matter of interest (e.g., text characters or glyphs) combine with such contextual data, the addition of the contextual data may improve classifier performance by reducing false positive and false negative classifications.

Other processing may follow, such as identifying lines of text based on the positively-classified MSERs (those classified as containing glyphs), and the original image can be binarized so that the MSERs in the image classified as containing glyphs are retained and other regions are blanked. The binarized image can then be processed by an optical character recognition (OCR) system to recognize text.

The feature vectors from the downscaled images may also be used with a trained classifier to provide a "gating" function. The gating functionality works by determining whether the contextual features of an image (FIG. 2A) or sub-region of the image (FIG. 2B), as expressed by the feature vector derived from the downscaled imaged, are similar to a classifier model that was trained with images of scenes that are indicated as containing or not containing text. A score is assigned by the classifier, and based on whether the score is above or below a threshold value, a determination is made as to whether to further process the image or sub-region (e.g., whether to proceed with identification of MSERs within the image or sub-region). This gating process function may be used as the pre-screening process discussed above or may follow that pre-screening process.

As an example of the gating function, images of the sky are unlikely to contain text, while images of a billboard are likely to contain text. The gating classifier does not need to identify that the image or sub-region contains the billboard or sky, but rather, compares contextual features in the form of feature vectors derived from the downscaled images (as described above in connection with FIGS. 1 and 3) with one or more classifier models generated from the contextual features of training images to determine whether the contextual features may be associated with glyphs (or whatever the target "objects" happen to be, such as cats, cars, or people). If the classified contextual features result in a score fall below a threshold value (i.e., indicating a lack of similarity), the system can forgo further processing of that image or subregion (e.g., skip identification of candidate glyph MSERs and OCR). When using the gating function, the classifier used to classify the candidate MSER regions as containing and not-containing glyphs may classify based on the MSERs features (e.g., Table 2) alone, or based on the MSER features combined with the feature vector(s) resulting from the disclosed processing of the downscaled images.

Additional details in relation to using contextual features to identify text and objects may be found in U.S. application Ser. No. 14/463,746 entitled "Leveraging Image Context For Improved Glyph Classification" in the name of Pradeep Natarajan, filed on Aug. 20, 2014, which is incorporated herein by reference in its entirety. The feature vectors resulting from the downscaled images, as discussed herein in connection with FIGS. 1 and 3, may be substituted for the codebook-quantized contextual features produced by the Bag-of-Words (BoW), Kernel Codebooks, and Fisher Vectors pipelines disclosed in the incorporated application. As the feature vectors disclosed herein are less complex than the pre-codebook feature vectors produced by those pipelines, code-book based quantization is not necessary with the downscaled image process disclosed herein.

Any classifier may be used, such as the Support Vector Machines (SVMs), neural networks, decision trees, AdaBoost (short for "Adaptive Boosting") combined with decision trees, and random forests disclosed above. A specific example of a trained classifier well-suited for text character classification is a Support Vector Machine (SVM) classifier employing a Radial Basis Function (RBF) kernel. A support vector machines (SVM) is a supervised learning model with associated learning algorithms that analyze data and recognize patterns, such as the patterns in images, used for classification and regression analysis. Given a set of training examples, each marked as belonging to one of two categories, an SVM training algorithm builds a model that assigns new examples into one category or the other, making it a non-probabilistic binary linear classifier. An SVM model may be mapped so that the examples of the separate categories are divided by a clear gap. New examples are then mapped into that same space and predicted to belong to a category based on which side of the gap they fall on.

As noted above, combining both MSER-derived data and the aggregated feature vectors from the downscaled image/region 221/241 in which the MSER appears improves the rate at which the classifier system will correctly identify whether or not the sub region includes alphanumeric text when the classifier compares each sub region to text model data that may be generated by supervised learning. Adjacent regions that are identified as including alphanumeric text may then be combined into sequences (e.g., sequencing sub regions containing letters so that the letters may be processed as words), and the pixels in each of the sub regions may be binarized to enhance the contrast of the edges of each alphanumeric character. Once binarized, optical character recognition may be applied to the binarized contours, recognizing the characters and text sequences as words. Similar approaches may be employed to identify symbols, non-alphanumeric text (e.g., Kanji, Hanzi, etc.), and objects.

While the disclosed process may also be used to identify objects other than text, results applying the disclosed process together with a text identification algorithm appear in Table 3, with the percentages corresponding to correct identification of text in appearing in the captured image:

TABLE 3

|  | Email | URL | Phone | Username | Domain | Aggregate | Latency (ms) |
| --- | --- | --- | --- | --- | --- | --- | --- |
| Baseline | 67.3% | 69.8% | 82.2% | 72.6% | 70.3% | 73.9% | 220.72 |
| Baseline + SIFT | 68.0% | 71.0% | 83.0% | 73.4% | 71.0% | 74.7% | 261.95 |
| Baseline + Fast Patch Gradients | 67.5% | 70.3% | 83.2% | 72.8% | 70.9% | 74.4% | 248.17 |

To obtain the result in Table 3, the "baseline" was the ability of the process to correctly identify certain text features in test images (not illustrated). For each candidate MSER region identifying as potentially containing text, salient features such as stroke width and area were calculated (e.g., Table 2). For Baseline plus SIFT, SIFT features were concatenated onto the baseline results before applying text recognition. And for Baseline plus Fast Patch Gradients, the feature vectors of the disclosed system 100 were concatenated onto the baseline results.

The SIFT features improved overall performance by 0.8% over baseline, but also increased on-device latency by approximately 19%. The new fast patch gradient feature representation improved the baseline performance by 0.5% while reducing the latency increase to approximately 12%.

The multi aspect-ratio feature extraction and approximations presented above may also be used for local feature extraction in images and videos instead of traditional image features such as SIFT, HoG and video features such as space-time interest points.

Figure 5:
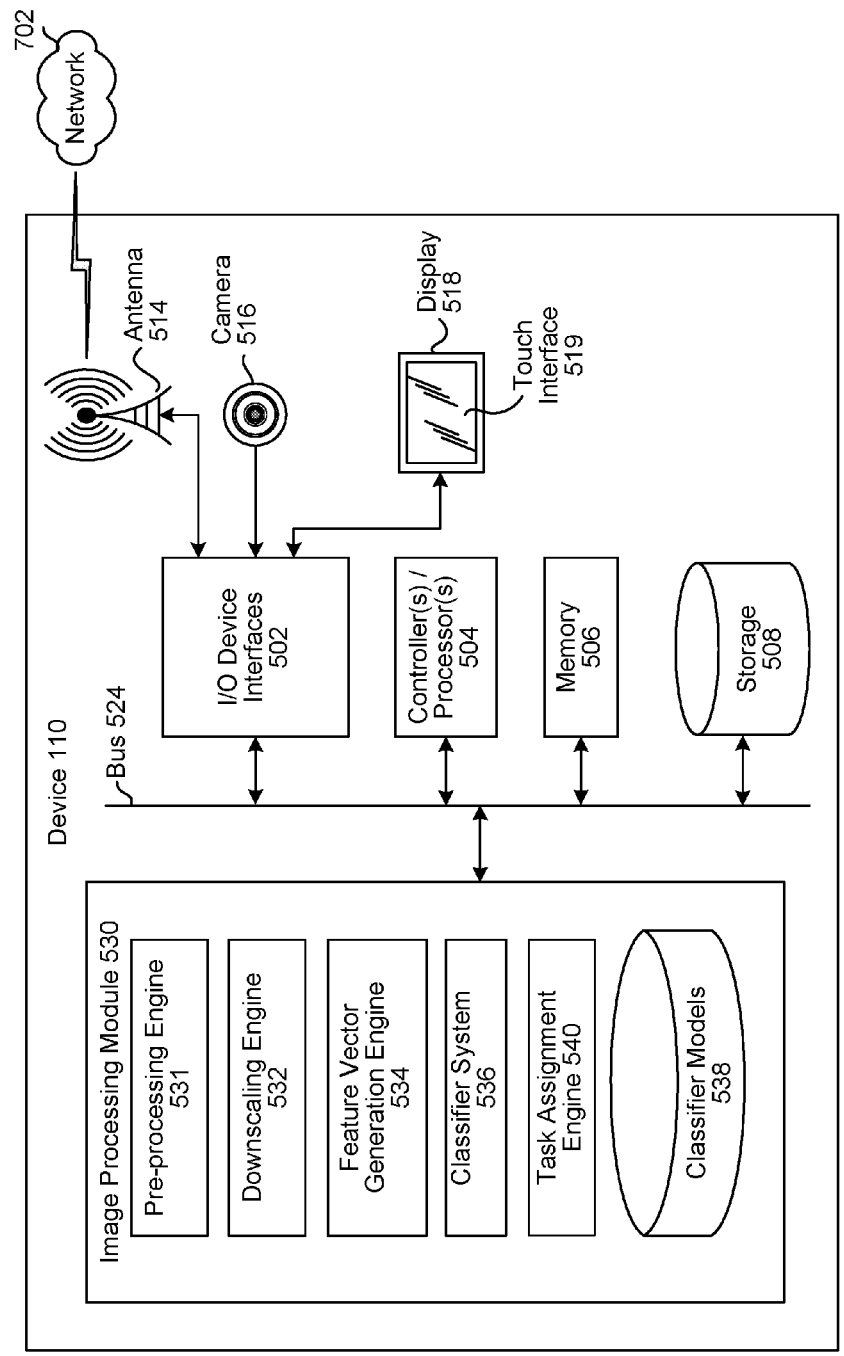
FIG. 5 is a block diagram conceptually illustrating example components of a device that may be included in the system.

FIG. 5 is a block diagram conceptually illustrating example components of the device 110 of the system 100 that captured the image. In operation, the device 110 may include computer-readable and computer-executable instructions that reside on the device 110, or that may reside on a network-connected device operating in conjunction with device 110, as will be discussed further below.

As illustrated in FIG. 5, the device 110 may include wireless network radio connectivity (e.g., antenna 514), one or more cameras (516), a display 518, and a user interface such as touch interface 519. If multiple cameras are included, at least two of the cameras may be arranged to capture stereo images, as some candidate character and object location identification algorithms are designed to operate on stereo images. "Camera" includes image capture systems used to capture images, and includes (among other things), cameras used for photography and for the capture of video. Image scanners such as flat-bed optical scanners may be substituted for a camera to capture the image 21.

The display 518 may be a display of any suitable technology, such as a liquid crystal display, an organic light emitting diode display, electronic paper, an electrochromic display, or other suitable component(s). The cameras 516, display 518, and other components may be integrated into the device 110, or may be separate, connected to the device 110 by a wired or wireless connection.

The device 110 may include an address/data bus 524 for conveying data among components of the device 110. Each component within the device 110 may also be directly connected to other components in addition to (or instead of) being connected to other components across the bus 524.

The device 110 may include one or more controllers/processors 504, that may each include a central processing unit (CPU) for processing data and computer-readable instructions, and a memory 506 for storing data and instructions. The memory 506 may include volatile random access memory (RAM), non-volatile read only memory (ROM), non-volatile magnetoresistive (MRAM) and/or other types of memory. The device 100 may also include a data storage component 508, for storing data and controller/processor-executable instructions (e.g., instructions to perform the processes illustrated in FIGS. 1 and 3). The data storage component 508 may include one or more non-volatile storage types such as magnetic storage, optical storage, solid-state storage, etc. The device 110 may also be connected to removable or external non-volatile memory and/or storage (such as a removable memory card, memory key drive, networked storage, etc.) through the input/output device interfaces 502.

Computer instructions for operating the device 110 and its various components (such as the engines 531 to 536 and 540 of the image processing module 530) may be executed by the controller(s)/processor(s) 504, using the memory 506 as temporary "working" storage at runtime. The computer instructions may be stored in a non-transitory manner in non-volatile memory 506, storage 508, or an external device. Alternatively, some or all of the executable instructions may be embedded in hardware or firmware in addition to or instead of software.

The device 110 includes input/output device interfaces 502. A variety of components may be connected through the input/output device interfaces 502, such as the display 518, a speaker (not illustrated), a microphone (not illustrated), and the user interface (e.g., touch interface 519). The input/output device interfaces 502 may also include an interface for an external peripheral device connection such as universal serial bus (USB), Thunderbolt or other connection protocol. The input/output device interfaces 502 may also include a connection to one or more networks 702 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. Through the network 702, the system 100 may be distributed across a networked environment, as will be discussed further below with FIG. 7.

The device 110 further includes an image processing module 530. The image processing module 530 performs the processes discussed in connection with FIGS. 1 and 3, and/or works in conjunction with another device in the system 100. For example, a first device 110 may include the camera(s) 516 and capture the image 21, whereas a second device 110 (or a server 112) includes all or part of the image processing module 530 that processes the captured image 21.

The image processing module 530 includes a preprocessing engine 531 that handles operations such as subdividing the captured image (e.g., FIG. 2B), and making an initial determination as to whether each sub region should be further processed (another example of where processing might be stopped is if MSER or HoG is performed on a region and nothing is identified). A downscaling engine 532 generates the plurality of downscaled images from the captured image 21 (e.g., 221, 241). Downscaling may be performed using conventional techniques, such as dividing the original height and width by the target height and width, grouping pixels based on the result, and then replacing the grouped pixels with a single pixel based on the groups median or mean values. The feature vector generation engine 534 generates the feature vectors for each downscaled image and combines the sub region features into the final composite feature vectors. Either the feature vector generation engine 534 and/or the pre-processing engine 531 may identify other features that may be used for classification, such as the MSER glyph classifier features discussed above (i.e., Table 2), depending in part upon the algorithm selected to identify features of interest.

The classifier system 536 processes the final feature vectors together with any extracted other features, such as conventional features used to classify objects, (e.g., text, particular objects, symbols, faces, etc.). Among other things, the classifier system 536 may be a Support Vector Machine (SVM) classifier employing a Radial Basis Function (RBF) kernel. The classifier models may be stored in storage 538, which may be a section of storage 508. Other classifiers, such as the others described above, may be used instead of an SVM.

FIG. 6 is a block diagram conceptually illustrating example components of the server 112 of the system 100. While some devices 110 that capture the image 21 may be able to execute their own processing pipeline, the task assignment engine 540 of a device 110 may delegate some tasks to the server 112 to process the captured image 21 (e.g., delegating classification or additional post-classification processing such as optical character recognition (OCR) to the server, transmitting image data to the server 112 over network 702 with an instruction as to what processing is to be performed and/or returned, and thereafter using and/or outputting the result received from the server 112). While some devices 110 that capture the image 21 may be able to execute their own processing pipeline, others may work in conjunction with the server 112 to process the captured image 21. In operation, the server 112 may include computer-readable and computer-executable instructions that reside on the server 112.

The server 112 may include an address/data bus 624 for conveying data among components of the server 112. Each component within the server 112 may also be directly connected to other components in addition to (or instead of) being connected to other components across the bus 624.

The server 112 may include one or more controllers/processors 604, that may each include a central processing unit (CPU) for processing data and computer-readable instructions, and a memory 606 for storing data and instructions. The memory 606 may include volatile random access memory (RAM), non-volatile read only memory (ROM), non-volatile magnetoresistive (MRAM) and/or other types of memory. The server 112 may also include a data storage component 608, for storing data and controller/processor-executable instructions (e.g., instructions to perform the processes illustrated in FIGS. 1 and 3). The data storage component 608 may include one or more non-volatile storage types such as magnetic storage, optical storage, solid-state storage, etc. The server 112 may also be connected to removable or external non-volatile memory and/or storage (such as a removable memory card, memory key drive, networked storage, etc.) through the input/output device interfaces 602.

Computer instructions for operating the server 112 and its various components (such as the engines 631 to 636 of the image processing module 630) may be executed by the controller(s)/processor(s) 604, using the memory 606 as temporary "working" storage at runtime. The computer instructions may be stored in a non-transitory manner in non-volatile memory 606, storage 608, or an external device. Alternatively, some or all of the executable instructions may be embedded in hardware or firmware in addition to or instead of software.

The server 112 includes input/output device interfaces 602. A variety of components may be connected through the input/output device interfaces 602. The input/output device interfaces 602 may also include an interface for an external peripheral device connection such as universal serial bus (USB), Thunderbolt or other connection protocol. The input/output device interfaces 602 may also include a connection to one or more networks 702 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. Through the network 702, the system 100 may be distributed across a networked environment, as will be discussed further below with FIG. 7.

The server 112 further includes an image processing module 630. The image processing module 630 performs the processes discussed in connection with FIGS. 1 and 3, and/or works in conjunction with another device in the system 100. For example, a device 110 may include the camera(s) 516 and capture the image 21, whereas the server 112 includes all or part of the image processing module 630 that processes the captured image 21.

The image processing module 630 includes a preprocessing engine 631 that handles operations such as subdividing the captured image (e.g., FIG. 2B), and making an initial determination as to whether each sub region should be further processed (another example of where processing might be stopped is if MSER or HoG is performed on a region and nothing is identified). A downscaling engine 632 generates the plurality of downscaled images from the captured image 21 (e.g., 221, 241). Downscaling may be performed using conventional techniques, such as dividing the original height and width by the target height and width, grouping pixels based on the result, and then replacing the grouped pixels with a single pixel based on the groups median or mean values. The feature vector generation engine 634 generates the feature vectors for each downscaled image and combines the sub region features into the final composite feature vectors. Either the feature vector generation engine 634 and/or the pre-processing engine 631 may identify other features that may be used for classification, such as the MSER glyph classifier features discussed above (i.e., Table 2), depending in part upon the algorithm selected to identify features of interest.

The classifier system 636 processes the final feature vectors together with any extracted other features, such as conventional features used to classify objects (e.g., text, particular objects, symbols, faces, etc.). Among other things, the classifier system 636 may be a Support Vector Machine (SVM) classifier employing a Radial Basis Function (RBF) kernel. The classifier models may be stored in storage 638, which may be a section of storage 608. Other classifiers, such as the others described above, may be used instead of an SVM.

How tasks are divided between the device 110 and the server 112 may be determined dynamically by task assignment engine 540 of the image processing module 530. The task assignment engine 540 may determine a speed of the connection via network 702 to the server 112. Based on criteria such as the speed of the network connection, the computational complexity of the process steps, and the computational capabilities of the controller(s)/processor(s) 504, the task assignment engine 540 may apply load balancing heuristics to dynamically divide processing steps between the other engines of the image processing module 530 of the device 110 and the image processing module 630 of the server 112.

The components of the device 110 as illustrated in FIG. 5 and the server 112 as illustrated in FIG. 6 are exemplary, and may be a stand-alone device or may be included, in whole or in part, as a component of a larger device or system. Also, while the system 100 has been discussed in the context of text and object detection, any symbolic features may be identified and recognized using the techniques discussed herein.

The concepts disclosed herein may be applied within a number of different devices and computer systems, including, for example, image-scanning general-purpose computing systems, server-client computing systems, "smart" cellular telephone computing systems, personal digital assistants (PDAs), cameras, image scanners, tablet computers, wearable computing devices (glasses, etc.), other mobile devices, etc.

As illustrated in FIG. 7, multiple devices (110*a* to 110*f*) may contain components of the system 100 and the devices may be connected over a network 702. Network 702 may include a local or private network or may include a wide network such as the internet. Devices may be connected to the network 702 through either wired or wireless connections. For example, augmented reality (AR) glasses 110*a*, a laptop computer 110*b*, a tablet computer 110*c*, a smart phone 110*e*, and a camera 110*f* may be connected to the network 702 through a wireless service provider, over a WiFi or cellular network connection or the like. Other devices, such as a desktop computer 110*d* and a server 112 may connect to the network 702 through a wired connection. Networked devices may capture images using one-or-more built-in or connected cameras 516 or image capture devices, with processing performed by an image processing module 530 of the same device or another device connected via network 702 (e.g., on desktop computer 110*d* or server 112).

The above examples are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, image processing, and classifier systems should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. In addition, one or more engines of the image processing modules 530 and 630 may be implemented as firmware in hardware. For example, portions of the downscaling engine 532 and 632 may be implemented as a digital signal processor (DSP) and/or application-specific integrated circuit (ASIC).

As used in this disclosure, the term "a" or "one" may include one or more items unless specifically stated otherwise. Further, the phrase "based on" is intended to mean "based at least in part on" unless specifically stated otherwise.

What is claimed is:

1. A method, comprising:
obtaining an image;
identifying a candidate location in the image that likely contains a text character;
determining candidate features for the candidate location;
downscaling the image into a first downscaled image having a first resolution and a first aspect ratio;
downscaling the image into a second downscaled image having a second resolution and a second aspect ratio, wherein the first resolution is different from the second resolution, and the first aspect ratio is different than the second aspect ratio;
generating first contextual image gradient features for the first downscaled image comprising first magnitude values and first angles;
generating second contextual image gradient features for the second downscaled image comprising second magnitude values and second angles;
normalizing the first magnitude values features to a uniform scale, producing normalized first contextual image gradient features;
normalizing the second magnitude values to the uniform scale, producing normalized second contextual image gradient features;
combining the normalized first contextual image gradient features, the normalized second contextual image gradient features, and the candidate features; and
determining that the candidate location contains at least one text character, using the combined features and at least one classifier model,
wherein the first and second magnitude values are approximated, and the first and second angles are quantized.

2. A computing device comprising:
at least one processor;
a memory including instruction operable to be executed by the at least one processor to perform a set of actions to configure the at least one processor to:
downscale an image into a first downscaled image having a first resolution and a first aspect ratio;
downscale the image into a second downscaled image having a second resolution that is different than the first resolution and a second aspect ratio that is different than the first aspect ratio;
generate first image gradient features for the first downscaled image, wherein the instructions to generate the first image gradient features include instructions to:
determine an X gradient for a pixel of the first downscaled image,
determine a Y gradient for the pixel;
approximate a magnitude of a gradient vector associated with the pixel within the first downscaled image based on the X gradient and the Y gradient, and
assign the gradient vector a quantized angle value;
generate second image gradient features for the second downscaled image;
concatenate the first image gradient features and the second image gradient features; and
process the concatenated image gradient features to identify an object in the image or determine a characteristic of the image.

3. The computing device of claim 2, wherein the instructions to assign the gradient vector the quantized angle value include instructions to:
  determine an angle for the X and Y gradients; and
  convert the angle into the quantized angle value.

4. The computing device of claim 2, wherein the instructions to assign the quantized angle value to the gradient vector include instructions to:
  assign the quantized angle value for the gradient vector based on a comparison of the X gradient with the Y gradient.

5. The computing device of claim 2, wherein the characteristic of the image is a likelihood that at least a portion of the image does not comprise a text character, glyph, or object.

6. The computing device of claim 2, wherein the instructions to process the concatenated image gradient features use a classifier system to identify the object or determine the characteristic.

7. The computing device of claim 2, wherein the instructions further configure the at least one processor to:
  identify a sub-region of the image as being likely to contain a text character, glyph, or object;
  generate third image gradient features for the sub-region; and
  concatenate the third image gradient features with the first and second image gradient features,
  wherein the instructions to process the concatenated image gradient features process the third image gradient features concatenated with the first and second image gradient features.

8. The computing device of claim 7, wherein the sub-region is identified as a maximally stable extremal region (MSER).

9. The computing device of claim 2, wherein the object comprises a text character or a glyph.

10. A non-transitory computer-readable storage medium storing processor-executable instructions for controlling a computing device, comprising program code to configure the computing device to:
  downscale an image into a first downscaled image having a first resolution and a first aspect ratio;
  downscale the image into a second downscaled image having a second resolution that is different than the first resolution and a second aspect ratio that is different than the first aspect ratio;
  generate first image gradient features for the first downscaled image, wherein the program code to generate the first image gradient features further configuring the computing device to:
    determine an X gradient for a pixel of the first downscaled image,
    determine a Y gradient for the pixel;
    approximate a magnitude of a gradient vector associated with the pixel within the first downscaled image based on the X gradient and the Y gradient, and
    assign the gradient vector a quantized angle value;
  generate second image gradient features for the second downscaled image;
  concatenate the first image gradient features and the second image gradient features; and
  process the concatenated image gradient features to identify an object in the image or determine a characteristic of the image.

11. The non-transitory computer-readable storage medium of claim 10, wherein the program code to assign the gradient vector the quantized angle value further configures the computing device to:
  determine an angle for the X and Y gradients; and
  convert the angle into the quantized angle value.

12. The non-transitory computer-readable storage medium of claim 10, wherein the program code to assign the quantized angle value to the gradient vector include instructions to:
  assign the quantized angle value for the gradient vector based on a comparison of the X gradient with the Y gradient.

13. The non-transitory computer-readable storage medium of claim 10, wherein the characteristic of the image is a likelihood that at least a portion of the image does not comprise a text character, glyph, or object.

14. The non-transitory computer-readable storage medium of claim 10, wherein the program code to process the concatenated image gradient features uses classifier system to identify the object or determine the characteristic.

15. The non-transitory computer-readable storage medium of claim 10, wherein the program code further configures the computing device to:
  identify a sub-region of the image as being likely to contain a text character, glyph, or object;
  generate third image gradient features for the sub-region; and
  concatenate the third image gradient features with the first and second image gradient features,
  wherein the instruction to process the concatenated image gradient features process the third image gradient features concatenated with the first and second image gradient features.

16. The non-transitory computer-readable storage medium of claim 15, wherein the sub-region is identified as a maximally stable extremal region (MSER).

17. The non-transitory computer-readable storage medium of claim 10, wherein the object comprises a text character or glyph.

* * * * *